United States Patent [19]

Choate

[11] Patent Number: 5,714,419
[45] Date of Patent: Feb. 3, 1998

[54] COMPOSITE MATERIAL SUITABLE FOR AIRCRAFT INTERIORS

[75] Inventor: Martin T. Choate, Winona, Minn.

[73] Assignee: Fiberite, Inc., Tempe, Ariz.

[21] Appl. No.: 798,234

[22] Filed: Feb. 11, 1997

Related U.S. Application Data

[63] Continuation-in-part of Ser. No. 286,058, Aug. 4, 1994, Pat. No. 5,607,769.

[51] Int. Cl.$^6$ ................................................. B32B 9/00
[52] U.S. Cl. ........................ 442/136; 264/257; 428/408; 442/179
[58] Field of Search .................... 442/59, 136, 179; 428/408; 264/257

[56] References Cited

U.S. PATENT DOCUMENTS

| | | | |
|---|---|---|---|
| 3,842,144 | 10/1974 | Tanaha et al. | 525/83 |
| 3,985,704 | 10/1976 | Jones et al. | 260/42.32 |
| 4,379,876 | 4/1983 | Cliheman et al. | 524/109 |
| 4,446,255 | 5/1984 | Ying et al. | 523/205 |
| 4,446,262 | 5/1984 | Ohumura et al. | 524/89 |
| 4,529,755 | 7/1985 | Nishihawa et al. | 523/436 |
| 4,719,255 | 1/1988 | Yoshizumi et al. | 523/436 |
| 4,904,760 | 2/1990 | Gaku et al. | 528/422 |
| 4,916,174 | 4/1990 | Yoshizuma et al. | 523/436 |
| 5,122,417 | 6/1992 | Murawami et al. | 428/408 |
| 5,128,199 | 7/1992 | Iyer et al. | 428/408 |
| 5,149,584 | 9/1992 | Baher et al. | 428/408 |
| 5,216,077 | 6/1993 | Yoshizuma et al. | 525/68 |
| 5,360,861 | 11/1994 | Campbell | 524/494 |

*Primary Examiner*—James J. Bell
*Attorney, Agent, or Firm*—Gray Cary Ware & Freidenrich

[57] ABSTRACT

A fiber reinforced prepreg is provided comprising a carbon paper substrate and a thermoset resin with flame retardant components, the prepreg being particularly useful in the fabrication of aircraft interiors. The substrate may contain PAN carbon fibers and an alcohol binder. The resin may comprise between about 50% to 80% of the prepreg.

9 Claims, No Drawings

COMPOSITE MATERIAL SUITABLE FOR AIRCRAFT INTERIORS

RELATED APPLICATION(S)

This application is a continuation-in-part application of U.S. patent application Ser. No. 08/286,058, filed Aug. 4, 1994 now U.S. Pat. No. 5,607,769.

BACKGROUND OF THE INVENTION

The present invention relates to a prepreg that may contain a thermoset resin with flame retardant materials and a substrate impregnated with the thermoset resin that may meet certain flammability requirements for aircraft interior applications and to molded articles prepared from such prepregs.

Electrical and office equipment enclosures, such as computer cases, copier cases and telecommunications equipment, have previously been prepared from thermoplastic resins such as polycarbonates, acrylonitrile butadiene styrene (ABS) and polypropylene. These materials have the advantageous properties of toughness, flexibility and the ability to meet UL specifications by including fire retardant additives. However, the thermoplastics have the disadvantages of not being stiff due to their low modulus and an inability to flow into detailed molds due to their inherently high (molecular weight) melt viscosity. The high melt viscosity also results in an inability to be compounded with much more than 10 to 40% chopped fiber reinforcement resulting in less than half of the modulus values obtainable with thermosets even when such compounded thermoplastics are used. Also because of the relatively high melt viscosities and a lower modulus, thicker wall sections and, in some cases, ribs must be designed into molded parts to provide adequate rigidity and help to prevent burn (melt) through during flammability testing. As a practical matter, it is exceedingly difficult to mold wall sections much less than 0.060" thick due to the thermoplastic resins high melt viscosity and subsequent inability to flow into wall cavities this narrow with conventional injection molding equipment. The thermoplastics also exhibit the phenomena of melting when heat is applied. This phenomena has required the flammability test UL 94 5V itself (burn through test) to be modified so that the gas flame source is angled 20 degrees under the specimen to prevent melted material from dripping into the flame.

One way to overcome the disadvantages of melting (distortion) and the need for thick wall designs due to low modulus would be to use a thermoset resin. However, the conventional thermoset resins (i.e., epoxies and phenolics) are not tough enough for these applications resulting in cracking due to their relatively low impact strength.

In the aircraft industry, a tough, lightweight composite material that may be used in the interior side walls and other non-structural components, such as overhead bins, doors, ceiling, and floors, of an aircraft are desirable. These composite materials must meet the Federal Aviation Administration (FAA) aircraft interior flammability requirements. The desired material must be inexpensive, lightweight, and have a smooth surface finish. The composite material should be able to be compression molded into metal molds, sandwiched, and bonded to a honeycomb core.

A conventional composite material used for aircraft interiors included a woven composite material that required additional manufacture time and expense because the fabric had to be woven. These woven composite materials were not sufficiently strong to handle the stresses encountered in the aircraft interior, including luggage shifting during take-off and landing. In order to apply any paint or other decoration to the surface of these conventional woven materials, the surface of the finished woven material must first be sanded because the surface of the woven material was not sufficiently smooth to permit paint or other decoration to adhere to the surface. These woven materials also could not readily flow into fine molded details, such as ribs or decoratively etched or molded textures, so that additional finishing of the woven material was required to obtain the fine molded details.

There is a need for a composite material which avoid these and other problems of known composites, and it is to this end that the present invention is directed.

SUMMARY OF THE INVENTION

The invention provides a prepreg particularly suitable for use in the fabrication of aircraft interior non-structural components, such as floors, ceiling, overhead bins, and doors. The invention further provides a composite material which is lightweight, tough, and inexpensive. The composite material may also have a smooth surface finish that permits the composite material to be decorated without additional sanding. The composite material may also flow into a mold to form molded articles with fine molded details. The composite material may also satisfy the FAA aircraft interior flammability requirements of a low heat release rate and a low smoke density during combustion.

In accordance with the invention, a composite material is provided, comprising a modified thermoset resin having flame retardant components, a carbon paper substrate impregnated with said modified thermoset resin, wherein said carbon paper may comprise a predetermined percentage by weight of 0.5 inch length and predetermined percentage by weight of 1 inch length polyacrylonitrile carbon fibers bound together by an alcohol binder, such as polyvinyl alcohol. The thermoset resin may be a phenolic novolac resin, and the amount of resin may be equal to between 50% and 80% by weight based on the total weight of the prepreg. The substrate may have metal fibers to increase the electromagnetic shielding of the prepreg.

DETAILED DESCRIPTION OF A PREFERRED EMBODIMENT

The invention is particularly applicable to a composite material which is suitable for creating molded articles that may be used for non-structural components in the interior of an aircraft. It is in this context that the invention will be described. It will be appreciated, however, that the composite material in accordance with the invention has greater utility.

The invention broadly is a prepreg that may comprise a thermoset resin that may be impregnated on and into a substrate. Each of these components is described separately below. As is known to those skilled in this art, the term "prepreg" refers to a combination of a substrate such as a mat, fabric, nonwoven material or roving, and a resin that may be usually advanced to a B cure stage. In the cure cycle of a thermosetting resin, an A stage refers to the early stage in the reaction of the resin in which the resin is still soluble and fusible. A B stage is an intermediate stage in the reaction in which the thermosetting resin melt is being heated and still dissolves in certain solvents. In production, the treated substrate is usually precured to this stage to facilitate handling and processing prior to final cure. A C stage is the final stage in curing the thermosetting resin in which the resin becomes infusible and insoluble in common solvents.

Resins

Now, a preferred resin composition of the composite material in accordance with the invention will be described. The resin component employed in the prepregs of the present invention may be a thermoset phenol formaldehyde resin—i.e., a formaldehyde condensate with a malamine phenol. These resins are often referred to as "phenolic" resins. The phenolic resins may be of either the novolac or resole type. However, the novolacs are preferred due to the lower amount of free phenol and/or formaldehyde in these resins. Both the novolacs and resoles are phenol formaldehyde resins. The differences between these two types of phenolic resins result primarily from the ratio of phenol to formaldehyde used in the preparation of the resins. The resole resins are typically prepared with a molar excess of formaldehyde to phenol typically in the range of 1:1.5–2 under alkaline conditions. Novolac resins are prepared with a molar excess of phenol to formaldehyde usually about 1.25:1 under acidic conditions (with oxalic or hydrochloric add). In the resole resin, a trace amount of nitrogen is added to the resin slurry usually in the form of ammonia bubbled through the liquid or hexamethylenetetramine powder is mixed in to help promote reaction between the phenol and formaldehyde. The resole type resin is a relatively lower molecular weight (highly monomeric) semisolid or even liquid resin. It tends to be less stable than the more highly polymerized solid novolac resin at ambient temperatures. The phenol formaldehyde resins are well known and are described in the literature, for example in K. J. Saunders, *Organic Polymer Chemistry*, Chapman and Hall, N.Y. 1985, and A. Knap—L. A. Pilato, *Phenolic Resins Chemistry, Applications and Performance*, Springer—Verlong, N.Y. 1985.

Substrate

Now, the substrate of the composite material in accordance with the invention will be described. The substrate employed in the present invention may be any discontinuous fiber, including carbon, glass, kevlar or other conventional fiber reinforcements. Preferred results may be achieved with a carbon paper substrate having a weight of approximately 3 ounces per square yard. This material permits the prepreg manufacturer to achieve a higher prepregging throughput, and customers have fewer sheets to cut for a given charge weight. A preferred carbon paper may be prepared from "PAN" fibers, wherein "PAN" refers to fiber or filler made from polyacrylonitrile starting resin. To bind the carbon fibers together, an alcohol binder, such as polyvinyl alcohol (PVA), may be used. The alcohol binder may comprise between about 2% to 10% by weight of the substrate, and a preferred substrate may comprise about 5% by weight of PVA.

Lower weight substrate materials, such as those having weights of 2 and 2.5 ounces per square yard, may also be used. The substrate may contain 0.5 inch length and/or 1.0 inch length PAN carbon fibers. The substrate may contain between 50% to 100% by weight of the 0.5 inch PAN carbon fibers and 0% to 50% by weight of the 1.0 inch PAN carbon fibers. A preferred substrate may contain 50% by weight of 0.5 inch length and 50% by weight of 1.0 inch length carbon fibers. The length of the fibers may be varied depending upon the molded article being prepared from the prepreg and/or the mechanical properties required in the molded article.

Preparation of Prepreg

Now, a method for preparing the prepreg in accordance with the invention will be described. A resin composition may be prepared by dissolving the thermoset resin in a suitable solvent for the resin. Solvents which may be used include acetone, methyl ethyl ketone, methylene chloride, or any other low boiling point (less than 60 degrees C.) solvent. To the resulting solution, additives, such as pigments, flame retardants, lubricants, or cure accelerators (e.g. hexamethylenetetramine) may be added. The prepreg with the novalac phenolic resin may be stored at room temperatures while the resole type phenolic resin carbon prepregs must be refrigerated during storage.

The prepreg may comprise between 20% to 50% by weight of the substrate and between 50% to 80% by weight of the resin, and a preferred prepreg may comprise about 80% by weight of the resin and about 20% by weight of the substrate.

Preferred results may be achieved when a fire retardant material may be added into the resin composition. Suitable fire retardant materials may include halogen/antimony compounds including, for example, tetrabrominated bisphenol A and antimony oxide. A preferred flame retardant may be a phosphate ester, such as that manufactured by Hoechst Celanese as product numbers AP422 or IFR 23. An example of a resin compound in accordance with the invention will be described below.

One the resin composition is prepared, the substrate may be impregnated with the resin composition by means which are conventional in the art. In general, the substrate may be run through the resin composition. The substrate and the resin composition may then be dried to remove the solvent and partially cure the resin composition to the B stage. The resulting prepreg may be sheeted, stacked or rolled, and then shipped or stored.

Preparation of Molded Articles

Various molded articles may be prepared from the prepregs in accordance with the invention by means which are well known to those skilled in the art including compression molding and transfer molding. The prepreg may be molded into highly derailed pieces with wall thicknesses as thin as 1 millimeter. The details of the molding process, such as cure cycle, temperature and pressure, may be varied depending upon the configuration of the molded article being produced. In general, several sheets of the prepreg may be cut and stacked in a mold. The arrangement of the sheets depends upon the article being produced. For example extra strips or pieces of the prepreg may be included where extra strength is required in the final molded article. The prepregs of the present invention provide a design advantage in allowing for the preparation of molded articles having thinner wall sections due to the lower melt viscosity of the resins resulting in lighter weight enclosures having increased internal volume.

The molded articles in accordance with the invention may have a smooth, opaque, shiny surface finish because the substrate has a large amount of surface area which means that a large amount of resin composition may be impregnated within the substrate. Therefore, the prepreg in accordance with the invention has a high resin to substrate ratio of 50–80% resin so that a molded article made with the prepreg may have a smooth resin surface instead of a rougher substrate surface. The smooth surface in accordance with the invention requires no sanding of the molded article surface prior to further decoration. Thus, after the molded article is removed from the mold, paint or vacuum molded decorative light color polymer films may be applied to the surface of the molded article, in accordance with the invention. As described above, conventional woven materials require at least a sanding step prior to applying any decoration to the surface of the molded article.

The prepreg in accordance with the invention may be handled in a similar manner as conventional woven composites, but the prepreg in accordance with the invention may flow into a mold and may form molded articles with fine molded details, such as ribs and decoratively etched or textured surfaces of molded articles. As described above, conventional woven materials do not readily flow into the mold.

These molded articles formed with the composite material in accordance with the invention are less expensive that conventional woven carbon prepreg because the weaving step required for the woven prepreg is eliminated because a discontinuous, filamentized substrate is used. As described below in more detail, the molded articles may also have a low specific gravity and meet the FAA aircraft interior flammability requirements of a low heat release rate and a low smoke density during combustion.

A molded article formed with the prepreg in accordance with the invention also has new acoustic and electrical properties that may be beneficial to the aircraft industry. In particular, the prepreg may have electromagnetic interference (EMI) shielding properties as well as acoustic shielding properties. The discontinuous, filamentized substrate may provide some EMI shielding. To further increase the EMI shielding capabilities, stainless steel fibers or nickel coated graphite fibers may be added into the substrate. A prepreg formed with the additional fibers described above may have EMI shielding of greater than 40 dB over a wide frequency range of 100 Hz to 1000 MHz. The discontinuous filamentized substrate without the additional fibers may also provide acoustic shielding because the substrate, which is not woven, dissipates acoustic energy which reduces the acoustic energy that may be transmitted through the molded article.

In order to describe the present invention so that it may be more clearly understood, the following example is set forth. The example is set forth primarily for the purpose of illustration and any specific enumeration of the details or the material proportions contained therein should not be interpreted as a limitation on the concept of this invention.

In the examples, the following materials and test procedures were used: HRJ 10985 refers to a phenolic novalac resin available from Schenectady International, Inc.; AP422 refers to HOSTAFLAN AP422, a phosphate ester flame retardant available from Hoechst Celanese Corp., Charlotte, N.C.; HEXA refers to Hexamethylenetetramine; SOCCI wax refers to a Carnauba wax emulsion containing 50% solids in water; BLACK Solution refers to Carbon black/ nigrosine solution; 20301 carbon paper refers to a 3 oz/yd, 7 to 10 micrometer diameter, 50% 1 inch chop, 50% ½" chop, 5% PVA sized PAN based carbon fiber paper available from Technical Fibre Products Limited, Kendal, Cambria, England; and Flexural Strength and Flexural Modulus were measured by the procedure of ASTM D-790.

EXAMPLE 1

An example of the prepreg in accordance with the invention may have the composition and a range by weight of components set forth below:

| Percent by Weight (Low) | Percent by Weight (High) | Composition |
|---|---|---|
| 42 | 48.90 | Phenolic Novolac Resin (binder matrix) - HRJ 10985 |
| 3.5 | 4.08 | Ammonium polyphosphate (flame retardant) - AP422 |
| 5.6 | 6.52 | Tetra-bromobisphenol-A (flame retardant) |
| 1.4 | 1.63 | Antimony trioxide (synergist flame retardant) |
| 3.85 | 4.48 | Zinc Borate (smoke suppressant) |
| 2.1 | 2.45 | SOCCI wax (release agent and gloss promotor) |
| 1.75 | 2.04 | Zinc Sterate (release agent and gloss promoter) |
| 0.7 | 0.82 | Sodium Hydroxide (cure promotor) |
| 7 | 8.15 | HEXA (cross linking agent) |
| 2.1 | 2.45 | Black Solution (surface finish enhancer) |
| 30 | 18.5 | 20301 Carbon Paper |
| Total = 100% | Total = 100% | |

Each step of the preparation of the prepreg in accordance with the invention will now be described. First, the resin solution is prepared.

Preparation of Resin Solution

A resin solution was prepared by combining the phenolic novalac resin, the ammonium polyphosphate, the tetrabromobisphenol-A, the antimony trioxide, the zinc borate, the SOCCI wax, the sodium hydroxide, and the HEXA in which the amounts are in parts by weight based upon the total weight of the solution.

The solution above was stirred for approximately 10 minutes. To the resulting solution, 1.75 to 2.04 percent by weight of zinc stearate was added and the resulting solution was stirred for another 10 minutes. At the end of this time, 2.1 to 2.45 percent by weight of Black Solution was added and the resulting solution was stirred for another 3 minutes.

Preparation of Prepreg

To prepare the prepreg, the 20301 carbon paper from a roll was run at approximately 130 inches per minute through a bath containing the resin solution prepared above. The impregnated paper was run through a pair of driven stainless steel nip rolls set at a gap of from 0.018 to 0.024 inches to remove excess resin solution and achieve the a preferred pick-up of 70–81.5% by weight of the resin solution. The acetone solvent was removed by running the impregnated paper through convection heat in a forced air oven at 215°–250° F. The retention time in the convection heat zone was from 8–12 minutes. The result was a dry, tackless prepreg comprising about 80% solids by weight resin and 20% by weight carbon fiber. A sample of the prepreg was cured by heating for 80 seconds at from 150°–180° F. at from 1500–3200 psi in matched metal dies. The cured sample had the physical properties shown in the following table. The sample is also compared to the FAA aircraft interior flammability requirements.

| PROPERTY | FAA Flammability Requirements | EXAMPLE 1 |
|---|---|---|
| Peak Heat Release Rate [kW/m$^2$] | <65 | 38–44 |
| Two Minute Heat Release Rate [kW/m$^2$] | <65 | 39–46 |

-continued

| PROPERTY | FAA Flammability Requirements | EXAMPLE 1 |
| --- | --- | --- |
| Smoke Density [Ds @ 4 m] | <200 | 141–155 |
| Flammability 60 Sec. Vertical Burn Extinguishing Time [Sec] | <15 | 0 |
| Flammability 60 Sec. Vertical Burn Length [in] | <6 | 1.75 |
| Flammability 60 Sec. Vertical Burn Drip Extinguish Time [sec] | 3 | N/A - The thermoset resin does not drip. |
| Average Long Beam FLEXURAL STRENGTH [Ksi] | N/A | 11.2–18 |
| Minimum Long Beam FLEXURAL STRENGTH [Ksi] | N/A | 10–12 |
| Glass Transition Temperature - Flex TMA [degrees C.] | N/A | 164 |

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A prepreg comprising a modified thermoset resin having flame retardant components; a carbon paper substrate impregnated with said modified thermoset resin, said carbon paper substrate comprising a predetermined percentage by weight of 0.5 inch length and a predetermined percentage by weight of 1 inch length polyacrylonitrile carbon fibers and an alcohol binder.

2. A prepreg of claim 1, wherein the resin is a phenolic novolac resin.

3. A prepreg of claim 1, wherein said substrate comprises 50% by weight of 0.5 inch length and 50% by weight of 1 inch length polyacrylonitrile carbon fibers.

4. A prepreg of claim 1, wherein the amount of resin is equal to between about 50% and about 80% by weight based on the total weight of the prepreg.

5. A prepreg of claim 4, wherein the amount of resin is equal to about 80% by weight based on the total weight of the prepreg.

6. A prepreg of claim 1, wherein said alcohol binder comprises polyvinyl alcohol.

7. A prepreg of claim 1, wherein the substrate further comprises metal fibers to increase the electromagnetic shielding of the prepreg.

8. A molded article prepared from the prepreg of claim 1.

9. A prepreg of claim 1, wherein said flame retardant component comprises ammonium polyphosphate.

* * * * *